(12) United States Patent
Schilz et al.

(10) Patent No.: US 9,217,672 B2
(45) Date of Patent: Dec. 22, 2015

(54) MOTION AND GESTURE RECOGNITION BY A PASSIVE SINGLE PIXEL THERMAL SENSOR SYSTEM

(71) Applicant: Excelitas Technologies GMBH & Co. KG, Wiesbaden (DE)

(72) Inventors: Jürgen Schilz, Niedernhausen (DE); Arthur Barlow, Alton (GB); Anand Pandy, Quebec (CA)

(73) Assignee: EXCELITAS TECHNOLOGIES SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 14/196,151

(22) Filed: Mar. 4, 2014

(65) Prior Publication Data

US 2015/0253193 A1 Sep. 10, 2015

(51) Int. Cl.
- *G01J 5/02* (2006.01)
- *G01J 5/00* (2006.01)
- *G01J 5/10* (2006.01)
- *G01P 13/00* (2006.01)

(52) U.S. Cl.
CPC .................. *G01J 5/0025* (2013.01); *G01J 5/10* (2013.01); *G01P 13/00* (2013.01)

(58) Field of Classification Search
CPC  G06F 3/013; G06F 3/017; G06F 2203/04803
See application file for complete search history.

(56) References Cited

U.S. PATENT DOCUMENTS

| | | | |
|---|---|---|---|
| 6,791,087 | B1 | 9/2004 | Okumura |
| 7,599,044 | B2 | 10/2009 | Hotelling et al. |
| 2005/0226532 | A1 | 10/2005 | Thompson |
| 2007/0210953 | A1 | 9/2007 | Abraham |
| 2008/0142716 | A1 | 6/2008 | Wong |
| 2010/0299390 | A1* | 11/2010 | Alameh et al. ................ 709/204 |

(Continued)

FOREIGN PATENT DOCUMENTS

| | | |
|---|---|---|
| DE | 102008024308 | 12/2009 |
| EP | 1180324 | 2/2002 |

(Continued)

OTHER PUBLICATIONS

Cool Eye Thermopile Array Modules With Integral Optics for Safety and Security, web article: TPiL 08T 2146 L3.9, TPiA 16T 4146 L3.9 Thermopile Array "Cool Eye," ww.excelitas.com, pp. 39-44.

(Continued)

*Primary Examiner* — Kiho Kim
(74) *Attorney, Agent, or Firm* — Peter A. Nieves; Sheehan Phinney Bass+Green PA

(57) ABSTRACT

Systems and methods for recognizing a gesture made by a warm object are presented. The system includes a thermal sensor configured to generate a low frequency or direct current signal upon receiving thermal energy. A spatially modulating optic is disposed between the thermal sensor and the warm object. The optic is configured to modulate the thermal energy received by the thermal sensor as a function of an orientation of the warm object with respect to the thermal sensor. An electronics unit in communication with the thermal sensor includes a memory and a processor. The processor is configured by the memory to detect a change in the thermal sensor signal and recognize a characteristic of the thermal sensor signal.

18 Claims, 7 Drawing Sheets

(56) References Cited

U.S. PATENT DOCUMENTS

| | | | |
|---|---|---|---|
| 2011/0010572 A1 | 1/2011 | Chen | |
| 2013/0214166 A1 | 8/2013 | Barlow et al. | |
| 2013/0335546 A1* | 12/2013 | Crane et al. | 348/78 |
| 2014/0314123 A1 | 10/2014 | Schilz et al. | |

FOREIGN PATENT DOCUMENTS

| | | |
|---|---|---|
| JP | H02-187690 A | 7/1990 |
| JP | H0686016 U | 12/1994 |
| JP | H07-180693 | 7/1995 |
| JP | 2001235552 | 8/2001 |
| JP | 2001330682 | 11/2001 |
| JP | 2007205796 | 8/2007 |
| JP | 2013131010 | 7/2013 |

OTHER PUBLICATIONS

Datasheet IR Sensing Solutions, DigiPile Family, web article: "Digital Thermopile," www.excelitas.com, Digipile Family May 31, 2011, pp. 1-4.

Samsung Electronics Co. Ltd.; Gesture Sensor for Mobile Devices; http://www.techonline.com/electrical-engineers/education-training/tech-papers/4420524/Gesture-Sensor-for-Mobile-Devices, downloaded Oct. 2013.

\* cited by examiner

MOTION AND GESTURE RECOGNITION BY A PASSIVE SINGLE PIXEL THERMAL SENSOR SYSTEM

FIELD OF THE INVENTION

The present invention relates to thermal sensors, and more particularly, is related to infrared sensing proximity detectors.

BACKGROUND OF THE INVENTION

Motion detectors typically employ passive infrared (IR) sensors that detect the heat from moving persons or other warm objects and generate an electrical signal. Such detectors typically include a pyroelectric material and a multi-modulating optics, often referred as Fresnel lens, alternatingly focusing light on two pyroelectric elements. The pyroelectric elements generate an electrical signal if the incoming heat flux changes over time. The pyroelectric detector thus acts as natural electrical high-pass by being sensitive to motions occurring above a certain typical frequency range. Depending on the sensing element size, the cut-off frequency may be as low as 0.4 Hz for large element sizes or higher for smaller elements. Typically, motions of a person occur in the range of approximately 0.4 Hz to 4 Hz, so elements and signal processing electronics in proximity detectors are typically tuned to this range. For decades, pyroelectric infrared (IR) detectors were considered the easiest approach to motion sensing for light switches and alarm units since they deliver high signal levels which could be processed by then available analog electronics.

More recently, a single pixel thermal sensor has been developed to detect a frequency response down to steady-state heat flux (direct current (DC)) in conjunction with a multi-element modulating optics which modulates the signal over the total field-of-view (FOV) of the sensor. Such a device is able to detect motions within a much broader frequency range, even down to DC, which corresponds to the detection of stationary objects ("Presence Detection") or to higher frequencies, which additionally allows the detection of faster human bodily motions, such as hand waving or other gestures Previously, gesture recognition techniques have generally been divided into imaging and non-imaging techniques. The imaging techniques typically employ multi-pixel sensors with optics that map the FOV onto the different pixels, so motions and gestures can be evaluated by means of image processing methods. While many of the imaging methods evaluate motion in a two dimensional plane, imaging may also be performed in three dimensions by including depth information, which can be achieved by a variety of methods such a time-of-flight, stereo images, structured light pattern recognition, or others.

Fewer non-imaging gesture recognition techniques have been employed. One non-imaging technique utilizes an electric field, in which change is detected by means of a capacitive detector array in the sensing plane. Another non-imaging method employs the reflection of an infrared beam sent out by an IR light-emitting diode (IR LED). The beam is reflected off an object and is detected by one or more photodiodes. These non-imaging methods incorporate multi-pixel or multi-electrode sensors. The non-imaging solutions do not make an image of the scene, since there is not a defined relationship between a specific FOV segment with a certain detector pixel.

Analysis of frequency patterns in the output of non-imaging sensing devices is known. For example, inertial sensors, as commonly employed in mobile device for the detection of motion of the device, may have software that looks for frequency and amplitude patterns and for the fingerprint of a certain detected physical motion. As such, the software can determine, for example, if the user carrying the mobile device is walking, driving in a car or on a train. It is also possible to determine if the device is lifted up and placed at the ear of a user to take a call, solely by comparing frequency and amplitude pattern of the inertial sensor output signal with those in a library of gesture signatures. Such pattern recognition software may be self-learning, and the library can be extended or adjusted by extracting common patterns from other behavior of a user. However, the output of non-imaging sensors has been insufficient to recognize multi-dimensional movement or gestures.

Therefore, there is a need in the industry for a gesture recognition solution that addresses at least some of the abovementioned shortcomings.

SUMMARY OF THE INVENTION

Embodiments of the present invention provide motion and gesture recognition by a passive single pixel thermal sensor system. Briefly described, the present invention is directed to a system configured to recognize a gesture made by a warm object, including a thermal sensor configured to generate a low frequency and/or direct current signal upon receiving thermal energy, a spatially modulating optic disposed between the thermal sensor and the warm object configured to modulate the thermal energy received by the thermal sensor as a function of an orientation of the warm object with respect to the thermal sensor, and an electronics unit in communication with the thermal sensor. The electronics unit includes a memory and a processor in communication with the memory. The processor configured by the memory to perform steps of detecting a change in the thermal sensor signal, and recognizing a characteristic in the thermal sensor signal.

A second aspect of the present invention is directed to a method for recognizing a gesture of a warm object moving in a monitored space. The method includes the steps of receiving incident thermal energy at a modulating optics from a field of view of the modulating optics within the monitored space, wherein the modulating optics comprises a plurality of lenses and/or apertures, directing the incident thermal energy received by the modulating optics onto a thermal sensing device optically coupled to the modulating optics, producing, with the thermal sensing device, a direct current output signal that is sustained at a level proportional to an amount of thermal energy being directed to the thermal sensing device by the modulating optics, and providing the output signal to an electronics unit in communication with the thermal sensing device. The electronics unit includes a memory and a processor in communication with the memory. The processor configured by the memory to isolate a characteristic of the signal and compare the characteristic of the signal to a reference characteristic.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings

DETAILED DESCRIPTION

Figure 1:
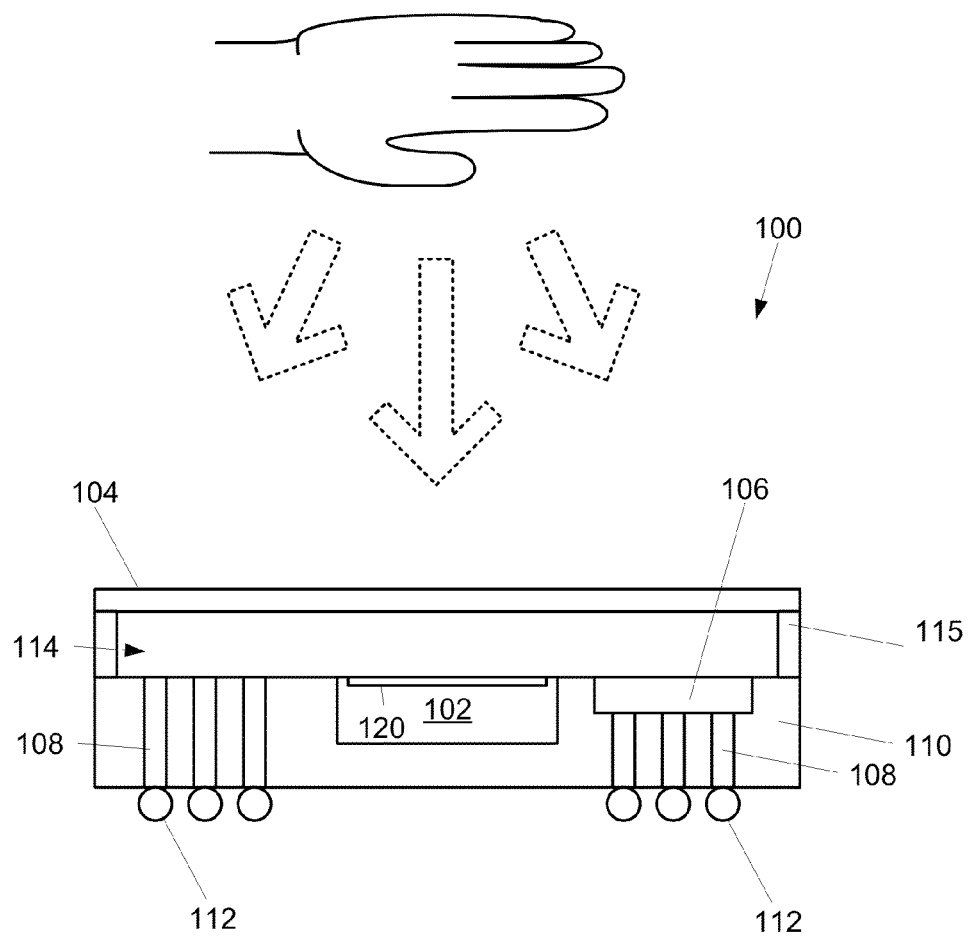
FIG. 1 is a schematic, cross-sectional side view of a first embodiment of a gesture detector.

The following definitions are useful for interpreting terms applied to features of the embodiments disclosed herein, and are meant only to define elements within the disclosure. No limitations on terms used within the claims are intended, or should be derived, thereby. Terms used within the appended claims should only be limited by their customary meaning within the applicable arts.

As used within this disclosure, "lens" refers to an optical element that affects the amount and/or direction of electromagnetic radiation or light conveyed through it. A lens may affect transmitted radiation based on the size and/or geometry of an aperture and the shape and spacing of radiation transmitting media, for example, glass. As used herein, a lens may refer to a passive optical element, or an active optical element.

As used within this disclosure, "warm object" refers to an object emitting heat detectable by a thermal presence detector. A warm object generally refers to a person or animal.

In general, the phrase "monitored space" refers to a physical area (e.g., a room, hallway, outdoor area, etc.) where a presence detector is positioned and where the detector can potentially detect the warm object. However, a monitored space may also refer to a smaller region in the proximity of a thermal imaging device, including at least a portion of a field of view of the detector.

Reference will now be made in detail to embodiments of the present invention, examples of which are illustrated in the accompanying drawings. Wherever possible, the same reference numbers are used in the drawings and the description to refer to the same or like parts.

Embodiments of methods and devices for gesture recognition with a single pixel thermal sensor system using appropriate evaluation and optics are presented. An exemplary embodiment of a gesture recognition system includes a thermal detector with modulating optics. The spatial modulation of the FOV of the detector enhances the motion signal output by the detector and may provide a signature which may be recognized, for example, in a certain frequency band. Such a signature can be evaluated by either software or appropriate hardware.

FIG. 1 is a schematic, cross-sectional side view of a first embodiment of an exemplary detector 100 configured to recognize a gesture based upon the detected presence, position, motion and/or direction of motion produced by a warm object within a monitored space where the detector 100 is positioned and where the detector 100 can potentially detect the warm object.

The detector 100 has a sensor module 102 with a thermal sensing device 120, for example a thermopile, and an intensity modulating optics 104 at least partially covering the sensor module 102. The optics 104 may consist of a plurality of lenses, each of which is arranged to direct incident thermal energy from the monitored space onto at least part of the sensor module 102. In some implementations, each individual lens of the modulating optics 104 directs incident thermal energy from one of multiple different physical zones in the monitored space onto the sensor module 102. Such physical zones may be overlapping or non-overlapping, both in terms of angular range in front of the detector 100 and distance from the detector 100.

The modulating optics 104 may be directly attached to the detector 100 as depicted, or it may also be mounted at a distance to the detector. There may be a cavity 114 within the detector 100 separating the optics 104 from the sensor module 102, or the optics 104 may directly abut the sensor module 102. The modulating optics can assume many forms as described below.

The thermal sensing device 120 is generally operable to produce a direct current (DC) output that is substantially proportional to an amount of thermal energy (depicted by dashed arrows) being received at that thermal sensing device 120. The DC output produced by the thermal sensing device 120 remains generally constant as long as the amount of thermal energy being delivered to that thermal sensing device 120 remains substantially constant. Increases in the amount of thermal energy being delivered to the thermal sensing device 120 generally result in a proportional increase in the DC output being produced by the sensing device 120. Likewise, decreases in the amount of thermal energy being delivered to the thermal sensing device 120 generally result in a proportional decrease in the DC output being produced by the sensing device 120. Under the first embodiment, the thermal sensing device 120 is a single pixel thermal sensor. The DC output from the thermal sensing device 120 may be either a DC voltage or a DC current.

While the thermal sensor module 102 has a single pixel thermal sensing device 120, alternative embodiments may include two or more thermal sensing devices 120, where each thermal sensing device 120 has one or more pixels. However, the gesture recognition functionality described below may be accomplished on a detector 100 having only one single pixel thermal sensing device 120. In general, a thermopile is an electronic device that converts thermal energy into electrical energy. A thermopile is generally composed of several thermocouples electrically connected usually in series or, less commonly, in parallel, to produce a single direct current (DC) output.

As noted above, in some implementations, the thermal sensor module 102 has multiple thermal sensing devices 120 (e.g., multiple thermopiles). In some implementations, all of the thermal sensing devices in a sensor module 102 are connected together electrically to produce a single DC output signal from the sensor module 102. In some implementations, the thermal sensing devices 120 are configured so as to produce multiple different DC output signals from the sensor module 102.

As illustrated in the first embodiment, the sensor module 102 is embedded within the substrate or housing 110 and the modulating optics 104 is supported above the sensor module 102 atop optional legs 115 and the substrate 110. The optics 104 may have a variety of possible configurations. For example, the optics 104 can include a Fresnel lens or other lenses, Fresnel zones, zone plates, holographic optical elements, diffractive optical elements, refractive optical elements, binary optical elements, simple apertures, and any combination of these or any other arrangement that provide an intensity modulation with a spatially moving object. The modulating optics 104 may also include additional elements, for example, a spatial aperture array with total or partial light exclusion between apertures, a grating, a coding plate or disc, or any combination in any suitable arrangement in front of the sensor module 102.

Figure 2:
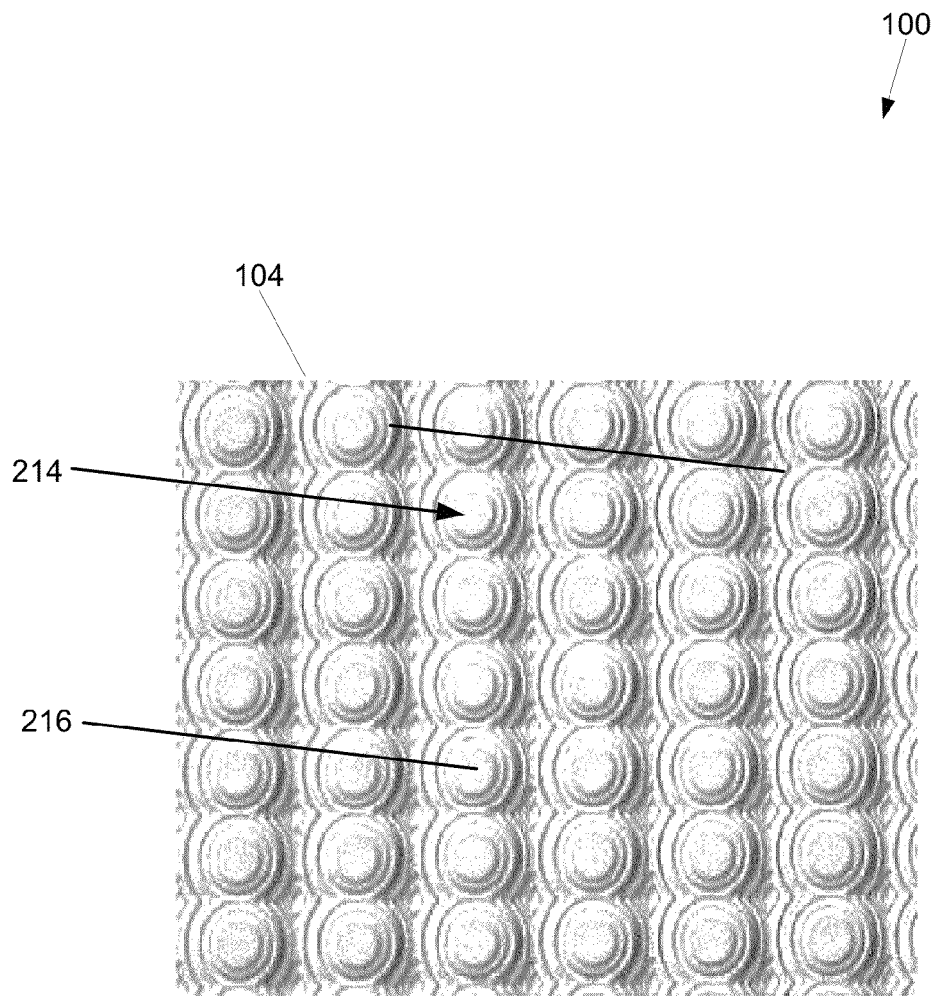
FIG. 2 is a partial top view of an example of the modulated detector-optics of FIG. 1.

FIG. 2 is a partial top view of the detector 100 in FIG. 1. The illustrated view shows one exemplary implementation of the modulating Optics 104 of the detector 100. The function of the optics 104 is to divide the monitored space into different segments. This segmentation is achieved by having optical elements on the modulating optics directing radiation only from a certain segment onto a certain thermal sensing device 120 within the module 102. These optical elements may coincide with discrete physical regions such as in the illustrated view of FIG. 2, but may also be distributed over the modulating optics 104 surface as it may be the case by using holographic optical elements, for example.

Each optical element typically not only divides the monitored space into segments, but also bundles radiation incident from that segment onto a specific thermal sensing device 120 (FIG. 1). If a warm object, for example, the hand of a person, moves through a segment, the signal generated by the respective thermal sensing device 120 starts at a low level and reaches the maximum when the hand is present at or near the middle of the segment. If the hand moves further, the signal level decreases to a low level again. A hand moving through multiple zones will thus generate a changing output pattern with maximum signal being fully within the segment and minimum signal being at the boundaries between segments.

The total number of monitored space segments may be equal or less than the number of optical regions of the modulating optics 2 times the number of thermal sensing devices 120 within the sensor module 102. In one embodiment, the modulating optics 104 has alternating regions of relatively high transmissivity and relatively low transmissivity. In general, the relatively high transmissivity regions allow a relatively large fraction of incident thermal energy at a wavelength of interest to pass through to the sensor module 102, whereas the relatively low transmissivity regions allow a relatively small fraction of thermal energy at the wavelength of interest to pass through to the sensor module 102. In a further embodiment, as illustrated in FIG. 2, the central portions 216 of each lens 214 form regions producing relatively high output signals and the peripheral portions of each lens 214 and the spaces between adjacent lenses 214 form regions with relatively low output signal from the sensing device.

The alternating regions of relatively high output signal and relatively low output signal help facilitate motion detection, because the fraction of thermal energy from the warm object that reaches the thermal sensor module 102 beneath the modulating optics 104 will change as that object moves through the monitored space, for example, from a space that corresponds to the relatively high output signal region of the modulating optics 104 to the relatively low output signal region of the modulating optics 104. In effect, the modulating optics 104 takes the constant thermal energy of the object and modulates it to form an alternating signal at the sensing device 120.

In general, the phase "wavelength of interest" refers to a wavelength or range of wavelengths to which the thermal sensing devices 120 are responsive (i.e., whatever wavelengths may affect the DC output from the thermal sensing devices). In a typical implementation, the wavelength of interest corresponds to the thermal energy emitted by a warm (living) object. In some implementations, the wavelength of interest is between 4 μm and 20 μm.

Referring again to FIG. 1, the illustrated detector 100 has an integrated circuit 106 that may, in various implementations, form a computer-based processor, a computer-based memory storage device and/or other circuitry to perform and/or support one or more of the functionalities described herein. Electrical conductors, for example traces that extend along the upper and/or lower surfaces of the substrate 110, vias 108 that extend through the substrate, solder bumps 112, etc., are provided to connect the internal electrical components of the detector 100, and to connect the detector 100 to external components.

Figure 3:
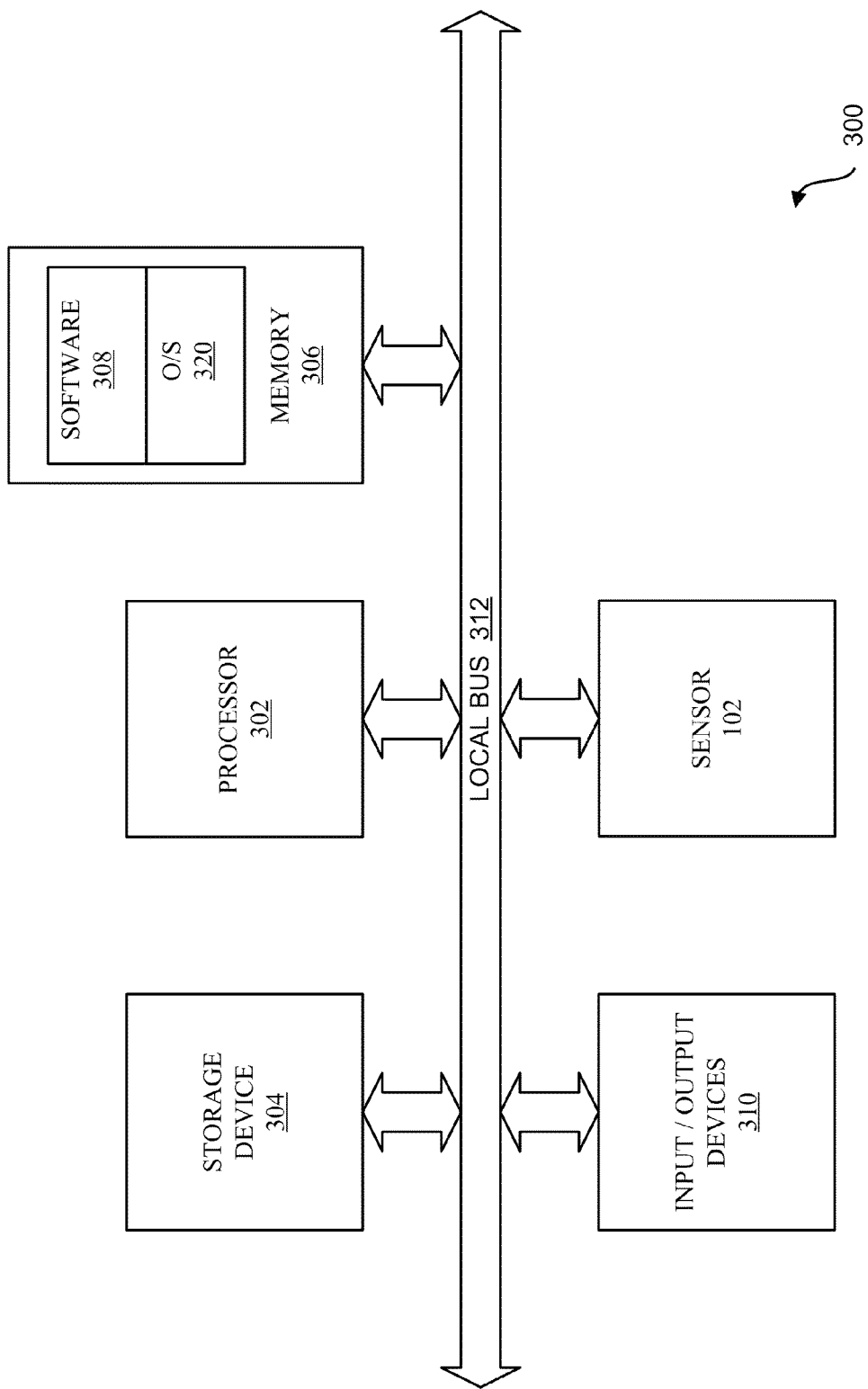
FIG. 3 is a schematic diagram showing an exemplary system for implementing the functionality of the detector of FIG. 1.

An exemplary system for executing the functionality described in detail above may be a computer, an example of which is shown in the schematic diagram of FIG. 3. It should be noted that the physical layout of the blocks shown in FIG. 3 may be distributed over two or more components, so that, for example, the sensor module 102 may located within the detector 100, while the processor 302 and/or the memory 306 are located remotely from the detector.

The exemplary layout shows a processor 302, a storage device 304, a memory 306 having software 308 stored therein that defines at least part of the abovementioned functionalities, input and output (I/O) devices 310 (or peripherals), the sensor module 102, and a local bus, or local interface 312 allowing for communication across subcomponents of the detector 100.

The local interface 312 can be, for example, one or more buses or other wired or wireless connections. The local interface 312 may have additional elements, which are omitted for simplicity, such as controllers, buffers (caches), drivers, repeaters, and receivers, to enable communications. Further, the local interface 312 may include address, control, and/or data connections to enable appropriate communications among the aforementioned subcomponents.

The processor 302 is a hardware device for executing software, such as the software stored in memory 306, or firmware. The processor 302 can be any custom made or commercially available single core or multi-core processor, a central processing unit (CPU), an auxiliary processor among several processors associated with the detector 100, a semiconductor based microprocessor (in the form of a microchip or chip set), a macroprocessor, or generally any device for executing software or firmware instructions. The processor 302 can be integrated, for example, into the integrated circuitry 106 of FIG. 1.

The memory 306 can include any one or combination of volatile memory elements (e.g., random access memory (RAM, such as DRAM, SRAM, SDRAM, etc.)) and/or non-volatile memory elements (e.g., ROM, hard drive, tape, CDROM, etc.) or a network connection to external servers. Moreover, the memory 306 may incorporate electronic, magnetic, optical, and/or other types of storage media. Note that the memory 306 can have a distributed architecture, where various components are situated remotely from one another, but can be accessed by the processor 302. The memory 306 can be integrated, for example, into the integrated circuitry 106 of FIG. 1.

In general, the software 308 includes instructions that, when executed by the processor 302, cause the processor 302 to perform one or more of the functionalities of the detector 100 (FIG. 1) disclosed herein. The software 308 in the memory 306 may include one or more separate programs, each of which contains an ordered listing of executable instructions. The memory 306 may contain an operating system (O/S) 320. The operating system may be operable to control the execution of programs within the detector 100 (FIG. 1) and may provide scheduling, input-output control, file and data management, memory management, and communication control and related services.

The I/O devices 310 may include interfaces to external devices to allow for outputting collected data or instructions to various peripheral components. The I/O devices 310 may also facilitate uploading software and the like to the detector 100 (FIG. 1).

The sensor module 102 may be, for example, an infrared sensor or any kind of sensor that is responsive to thermal energy. The sensor module 102 may include a single element sensor or a sensor array including two or more sensor elements. A sensor array may include multiple sensor elements within a single enclosure, or may include multiple enclosures, where each enclosure includes two or more sensor elements. The sensor module 102 may be configured to detect only infrared radiation, or may be tuned to receive wider bandwidths. The sensor module 102 may further include voltage regulation and noise reduction components. The sensor module 102 may convey sensing parameters, for example, ambient temperature and the temperature of a sensed object, to the processor 302 via the local interface 312.

Similarly, for an array sensor, the sensor module 102 may convey parameters for each individual array element, or may send derived parameters collated from all of the individual array sensor elements. The sensor module 102 may include an analog to digital converter, for example, to convert signals between analog and digital formats. In addition, the sensor module 102 may be configured to autonomously convey information, for example upon startup and when parameter changes are detected, or by sending periodic parameter reports. The sensor module 102 may be configured to convey parameter information when queried or polled, for example, by the processor 302.

The storage device 304 can be any type of memory storage device. In general, the storage device 304 is operable to store any data that will help the detector 100 perform one or more of the functionalities disclosed herein. The storage device 304 may be integrated into the integrated circuitry 106 in FIG. 1.

When the detector 100 (FIG. 1) is in operation, the processor 302 executes the software 308 stored in the memory 306, communicates data to and from the memory 306 and storage device 304, and generally controls operations of the detector 100 (FIG. 1). It should be noted that in some embodiments, one or more of the elements in the exemplary embodiment may not be present. Additionally, in some implementations, one or more of the elements in the exemplary embodiment may be located external to the detector 100 (FIG. 1).

The detector 100 (FIG. 1) may be used to provide gesture recognition (as a refined mode of motion and presence detection) through a true single pixel sensor. Under the first embodiment, gesture recognition may be achieved by analyzing the frequency and amplitude spectra of an output signal generated by the sensor module 102 that looks through spatially modulating optics 104. In contrast with the prior art which only detects the motion or presence of a warm object in the FOV of the detector 100 (FIG. 1), the gesture recognition functionality derives additional information, such as the nature of the motion, for example, fast, slow, near, far, direction, or even identifies specific gestures, for example arm or hand waving, fist making, or the formation of geometrical figures, such as moving the hand in a circle.

Figure 4A:
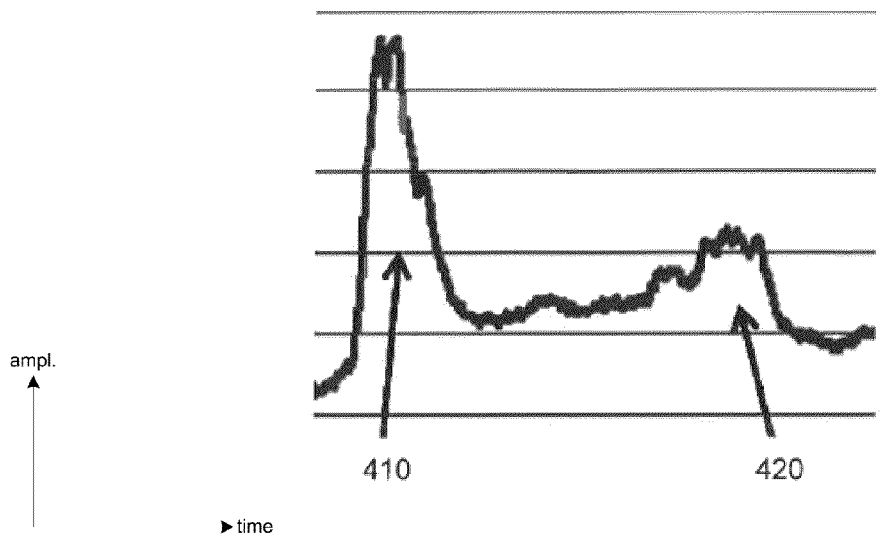
FIG. 4A is a graph of the signal output from a prior art single pixel thermal sensor without optics looking into the sensor viewing area.

FIG. 4A is a graph of the signal output from a single pixel thermal sensor looking into the FOV of the sensor module 102 without any special optics (modulating optics 104). For example, The FOV may be between 50° and 120° and a person passing along this FOV in 1 m or 2 m distance from the detector 100 (FIG. 1) generates the signal, where the signal amplitude depends upon the distance between the person and the detector 100 (FIG. 1). The signal indicates a first peak 410 when the person passes approximately 1 m in front of the detector 100 (FIG. 1), and a second peak 420 when the person passes approximately 2 m in front of the detector 100 (FIG. 1).

Figure 4B:
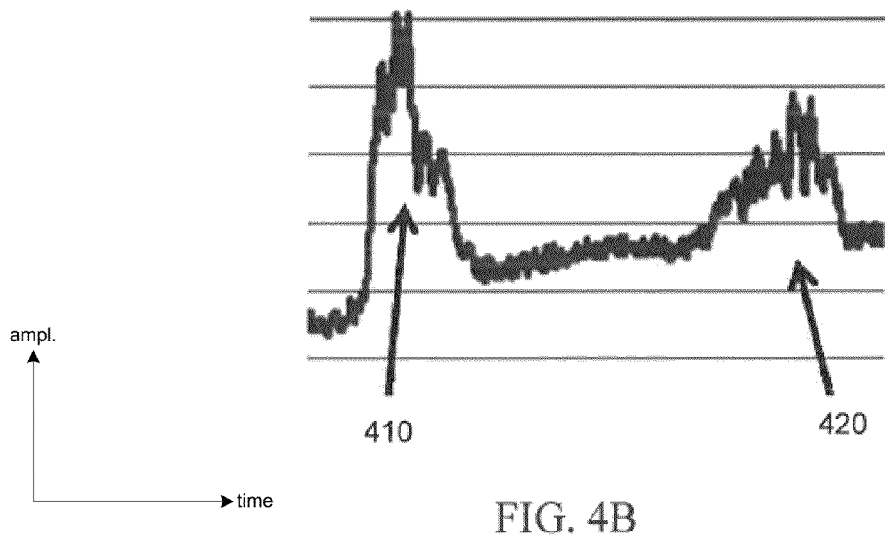
FIG. 4B is a graph of the signal output from the single pixel thermal sensor of FIG. 1 including modulated optics looking into the sensor viewing.

FIG. 4B is a graph of the signal output from the single pixel thermal sensor of FIG. 1 looking into the sensor viewing, in the presence of the same movement detected in the graph of FIG. 4A, where the detector 100 also includes the modulating optics 104 (FIG. 1). With the addition of the modulating optics 104, the resulting signal of a moving person is modulated as it passes through the FOV of the detector 100 (FIG. 1). The modulating optics 104 (FIG. 1) accentuates the frequency content of the resulting output signal.

Figure 4C:
FIG. 4C is the signal from FIG. 4B after band pass filtering.

FIG. 4C shows the output signal of FIG. 4B after filtering with a (numerical) band pass filter, which translates the motion-based signal modulation into an output signal. This signal determines the motion and its amplitude level provides information on the distance. FIG. 4C shows exemplary band pass filtered raw data, which illustrates how filtering enhances the detectability. In a prior art motion detector, at this point the filtered signal may be integrated and compared to a threshold value deciding whether motion has occurred or not. The band pass filtering operation may be performed, for example, by the processor 302 (FIG. 3) as configured by the software 308 (FIG. 3), or by another component, for example, a dedicated signal processor (not shown) in communication with the local bus 312 (FIG. 3).

Other signal processing of the signal from the sensor module 102 may be performed by this system, for example, conversion from the time domain to the frequency domain, for example, via a fast Fourier transform (FFT) processor. Signal filtering, signal smoothing, noise reduction and other signal processing functions are also possible. As with the band pass filtering, this signal processing may be performed by the processor 302 (FIG. 3) as configured by the software 308 (FIG. 3), or by one or more components, for example, a dedicated signal processor or filter.

Figure 5:
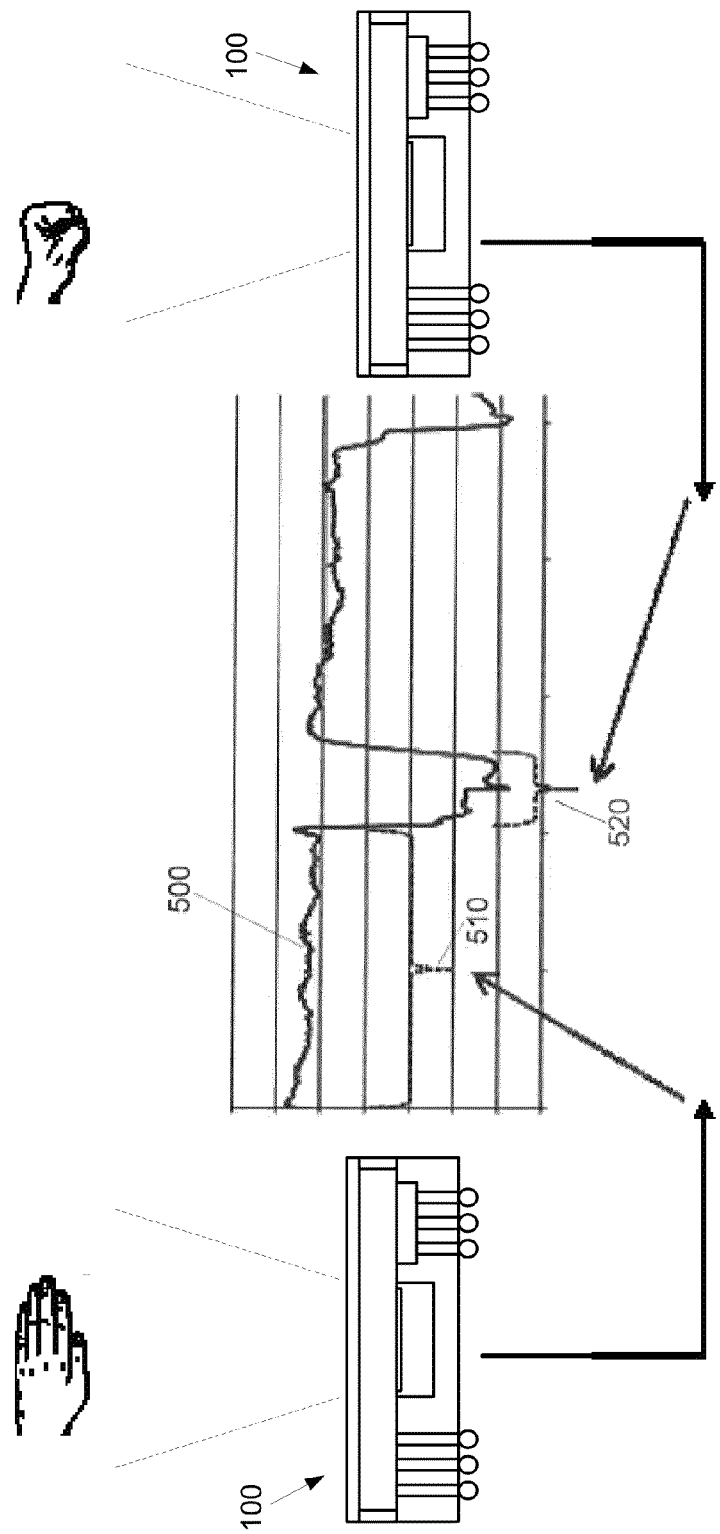
FIG. 5 is an explanatory diagram of a time-domain waveform produced by a hand gesture as detected by the single pixel thermal sensor of FIG. 1.

However, for gesture recognition under the first embodiment, additional information carried in the frequency pattern may be used to identify gestures. Specific motions or sequences of motion may exhibit a certain time and or frequency pattern in the signal output from the detector 100 (FIG. 1). As an example, FIG. 5 shows that a hand making a first has a distinct pattern 510, 520 in the received IR signal 500. The first has a smaller area and thus the signal 500 amplitude shows a sudden drop 520. Such a pattern may be recognized either in the time domain signal or in the frequency domain. The recognition of such a gesture may be used by a gesture recognizing process performed by the processor 302 (FIG. 3) as configured by the software 308 (FIG. 3). For example, the gesture may be recognized as a "click" event replacing a computer-mouse function.

Pattern recognition may be performed by the processor 302 (FIG. 3) as configured by the software 308 (FIG. 3). For example, the processor 302 (FIG. 3) may process the detector (FIG. 1) output signal to isolate characteristics in the signal from the sensor module 102 in the frequency domain and/or the time domain. The processor 302 (FIG. 3) may identify correlations between two or more characteristics in the frequency domain and/or the time domain. The processor may then look to match these characteristics and/or correlations with previously stored patterns, for example, reference patterns stored in the memory 306 (FIG. 3), also referred to as signatures. The signature may be stored locally or remotely, for example, in a remote server with access to a library of signatures. A signature may include a single signal characteristic, multiple characteristics, and relationships between characteristics, for example, in time, amplitude, and/or frequency. Correlation of frequency and time domain characteristics may be used to determine, for example, the speed of a gesture, or repetitions of a motion.

An exact match between a set of analyzed characteristics and a stored signature may not be needed for the processor 302 (FIG. 3) to declare a match. For example, a match may be declared if the correlation between signature characteristics and characteristics of the analyzed signal are above a configurable threshold level. The matching of analyzed characteristics and stored signatures may be performed by a signature library module.

As noted above, the modulating optics 104 may include a combination of apertures and radiation shaping components. In the case of the simple motion detection, a specific gesture pattern in the field of view of the modulating optics 104 is enhanced if the optics that project the object onto the sensor module 102 shows a modulation pattern as a function of view direction. This modulation can be, for a Fresnel lens, another type of microlens array, or other signal modulating patterns, such as a lens array 104 including more or fewer transmitting regions. Such modulation patterns in the modulating optics 104 cause the sensor module 102 to produce a signal that can be used for gesture recognition, without the use of an imaging sensor.

It should be noted, that while a single pixel is sufficient to determine certain motions or gestures, the use of multi-pixel solutions can be advantageous in some scenarios, for example, if recognition of the gesture is facilitated by determining the direction of movement. Even so, it is important to reiterate that such recognition is performed without an imaging sensor, since there is no unique relationship between an object point and a pixel.

Figure 6:
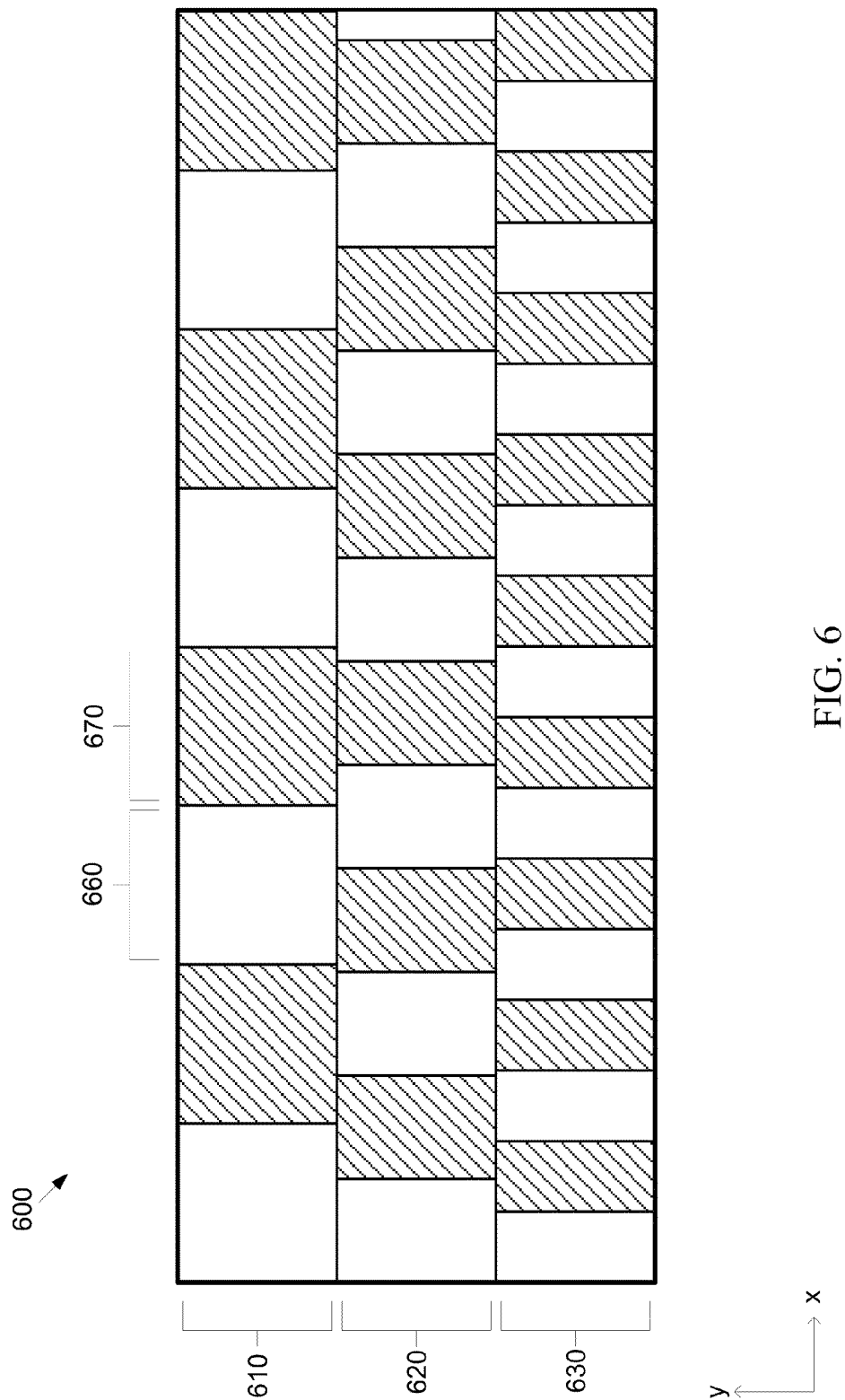
FIG. 6 is a graph of three modulation patterns used in exemplary optics used in conjunction with the single pixel thermal sensor of FIG. 1.

The spatial distance of the modulation pattern with respect to the sensor module 102 combined with the speed of the motion contribute the resulting frequency pattern detected by the sensor 102. Arrangements of the modulating optics 104 may be used where the intensity modulation has several different periods of intensity modulation as depicted by the graph 600 in FIG. 6. The graph 600 depicts regions of high transmissivity 600 as white blocks, and regions of lower transmissivity 670 as hashed blocks. In this example, three different high and low transmitting patterns 610, 620, 630 are placed along the x-axis with respect to the sensor 102, so a movement in the x-direction is modulated by 3 different frequencies corresponding to the transmitting patterns 610, 620, 630. This enhances detectability by the gesture recognition module and provides more details for determining recognizable characteristics (fingerprints) for the detection. While the graph 600 is simplified to show only two levels of transmissivity 660, 670, there is no objection to patterns with three or more levels of transmissivity. Similarly, while the graph 600 shows simple, linear patterns, the modulating optics 104 may have more complex transmissivity patterns that may or may not be linear.

The use of multimode optics to modulate the thermal radiation contributes additional information to the output signal of the single pixel thermal detector, enabling gesture recognition techniques previous unavailable to non-imaging sensors, optical infrared detectors in particular.

Figure 7:
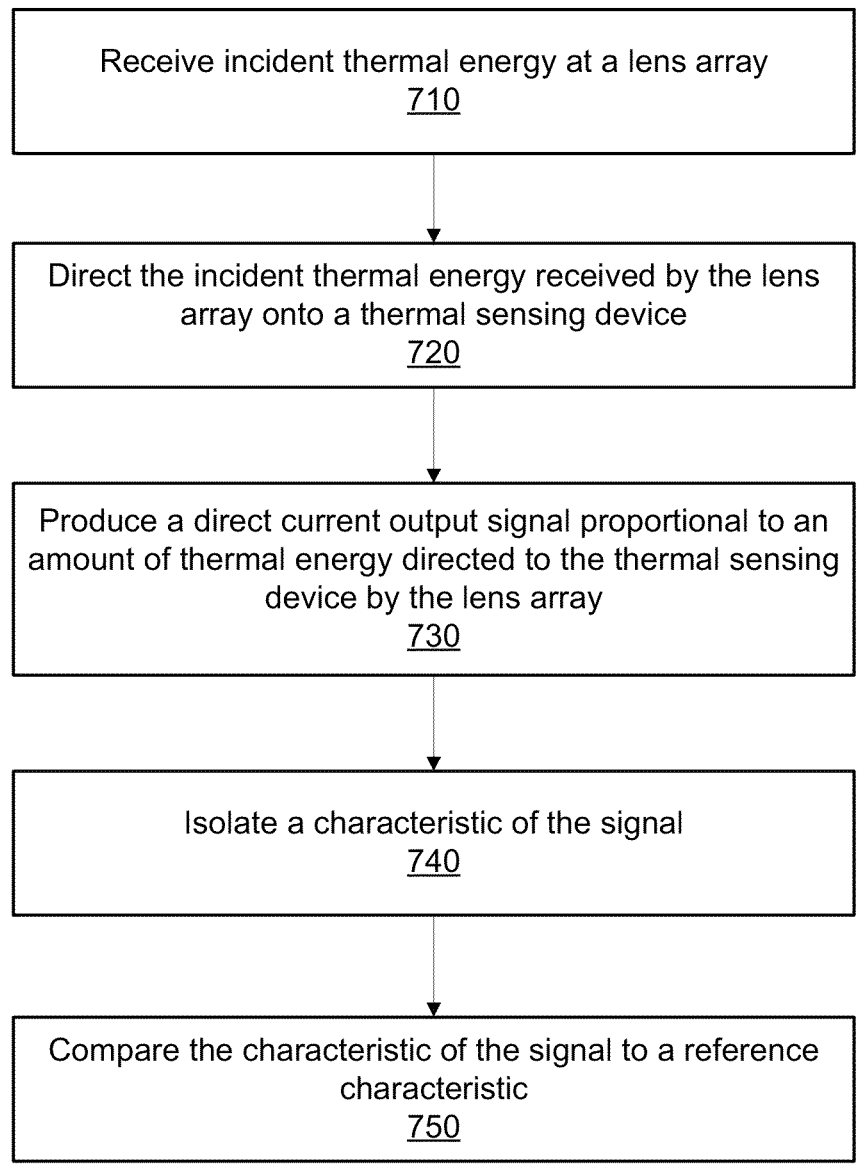
FIG. 7 is a flowchart of an exemplary method for recognizing a movement gesture in a monitored space.

FIG. 7 is a flowchart of an exemplary method for recognizing a movement gesture in a monitored space. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Incident thermal energy is received at a modulating optics 104 (FIG. 1), as shown by block 710. For example, the thermal energy may be received from a person making a gesture within the FOV of the modulating optics 104 (FIG. 1). The modulating optics 104 (FIG. 1) directs the incident thermal energy received by the modulating optics 104 (FIG. 1) onto a thermal sensing device 102 (FIG. 1), as shown by block 720. The thermal sensing device 102 (FIG. 1) produces a direct current output signal proportional to an amount of thermal energy directed to the thermal sensing device 102 (FIG. 1) by the modulating optics 104 (FIG. 1), as shown by block 730.

The modulating optics 104 (FIG. 1) may include regions with different thermal transmission characteristics, for example causing individual regions to transmit different modulations of the received thermal energy to different or overlapping regions of the thermal sensing device 102 (FIG. 1). These various modulations may be indicated in the output signal of the thermal sensing device 102 (FIG. 1). The modulating optics 104 (FIG. 1) is configured to modulate the thermal energy received by the thermal sensing device 102 (FIG. 1) as a function of an orientation of the gesturing object with respect to the thermal sensor. Such an orientation may be, for example, distance, angle, rate of motion, and/or direction of motion.

One or more characteristics of the signal may be isolated, as shown by FIG. 740. For example, the signal may be processed to isolate characteristics such as amplitude and time between events in the time domain, and frequency components in the frequency domain. This isolation of characteristics may be performed by a software controlled processor, a hardware signal processing component, or a combination of the two, as described previously. The one or more characteristics of the signal are compared to one or more reference characteristics, as shown by FIG. 750. The reference characteristics may be stored in a local memory, for example, in a reference characteristics library, or may be stored remotely. If the one or more characteristics are sufficiently similar to the one or more reference characteristics, a gesture associated with the one or more reference characteristics is deemed to be recognized. The threshold for determining whether the characteristics are sufficiently similar may be controllable. For example, level thresholds may be established where a certain number of characteristics, or a certain similarity of characteristics must be matched before a gesture is determined to be recognized.

In summary, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system configured to recognize a gesture made by a warm object, comprising:
 a thermal sensor configured to generate a low frequency and/or direct current signal upon receiving thermal energy;
 a spatially modulating optic disposed between the thermal sensor and the warm object configured to modulate the thermal energy received by the thermal sensor as a function of an orientation of the warm object with respect to the thermal sensor; and
 an electronics unit in communication with the thermal sensor, further comprising:
  a memory; and
  a processor in communication with the memory, the processor configured by the memory to perform steps comprising:
   detecting a change in the thermal sensor signal; and
   recognizing a characteristic in the thermal sensor signal.

2. The system of claim 1, wherein the thermal sensor is configured to detect radiation having a wavelength at least within the range of 4 µm and 20 µm.

3. The system of claim 1, wherein the thermal sensor is one of the group consisting of a thermopile, a microelectromechanical (MEMS) infrared sensor, a pyroelectric sensor, a bolometer, an intrinsic infrared semiconductor, and an infrared extrinsic semiconductor.

4. The system of claim 1, wherein the spatially modulating optic comprises one of the group consisting of a ground or molded multi-lens array, a molded Fresnel-lens array, and a combination of a multi-lens and a Fresnel-lens array.

5. The system of claim 1, wherein the spatially modulating optic further comprises one or more of the group consisting of a spatial aperture array with total or partial light exclusion between apertures, a grating, a coding plate or disc.

6. The system of claim 1, wherein the characteristic is detected in the time domain.

7. The system of claim 1, wherein the processor is further configured by the memory to perform steps comprising converting the thermal sensor signal from a time domain signal to a frequency domain signal.

8. The system of claim 7, wherein the characteristic is detected in the frequency domain.

9. The system of claim 7, wherein the characteristic comprises a correlation between a frequency domain event and a time domain event.

10. The system of claim 1, wherein the thermal sensor and the electronics unit are co-located within a single apparatus.

11. The system of claim 1, wherein the thermal sensor, the spatially modulating optic, and the electronics unit are co-located within a single apparatus.

12. The system of claim 1, wherein the thermal sensor and the spatially modulating optic unit are co-located within a single apparatus.

13. A method for recognizing a gesture of a warm object moving in a monitored space, comprising the steps of:
 receiving incident thermal energy at a modulating optics from a field of view of the modulating optics within the monitored space, wherein the modulating optics comprises a plurality of lenses and/or apertures;
 directing the incident thermal energy received by the modulating optics onto a thermal sensing device optically coupled to the modulating optics;
 producing, with the thermal sensing device, a direct current output signal that is sustained at a level proportional to an amount of thermal energy being directed to the thermal sensing device by the modulating optics; and
 providing the output signal to an electronics unit in communication with the thermal sensing device, the electronics unit further comprising a memory and a processor in communication with the memory, the processor configured by the memory to perform steps comprising:
  isolating a characteristic of the signal; and
  comparing the characteristic of the signal to a reference characteristic.

14. The method of claim 13, wherein the modulating optics provides optical zones with varying output signal over the individual zone thus producing alternating regions of relatively high output signal to the incident thermal energy and regions of relatively low output signal to the incident thermal energy.

15. The method of claim 13, wherein the thermal sensing device is selected from the group consisting of a micro-electro-mechanical (MEMs) infrared sensor, a thermopile, a bolometer, pyroelectric and a semiconductor-based infrared sensor.

16. The method of claim 13, wherein the lenses of the modulating optics are selected from the group consisting of Fresnel lens arrays, Fresnel zone arrays, holographic optical elements, diffractive optical elements, refractive optical elements and binary optical elements.

17. The method of claim 13, wherein the spatially modulating optic further comprises one or more of the group consisting of a spatial aperture array with total or partial light exclusion between apertures, a grating, a coding plate or disc.

18. The method of claim 13, wherein the direct current signal output is sustained at a level that is proportional to an amount of thermal energy being directed to the thermal sensing device with a wavelength between 4 µm and 20 µm.

* * * * *